United States Patent
Schaffel (12) 
(10) Patent No.: US 10,816,824 B2
(45) Date of Patent: Oct. 27, 2020

(54) MULTI-COLORED LENS CONFIGURED AS A GOLF AID

(71) Applicant: Robert L. Schaffel, West Hills, CA (US)

(72) Inventor: Robert L. Schaffel, West Hills, CA (US)

(*) Notice: Subject to any disclaimer, the term of this patent is extended or adjusted under 35 U.S.C. 154(b) by 24 days.

(21) Appl. No.: 16/166,037

(22) Filed: Oct. 19, 2018

(65) Prior Publication Data

US 2020/0033639 A1    Jan. 30, 2020

Related U.S. Application Data

(60) Provisional application No. 62/718,998, filed on Aug. 16, 2018, provisional application No. 62/636,749, filed on Feb. 28, 2018.

(51) Int. Cl.
*G02C 7/10* (2006.01)
*A63B 57/00* (2015.01)

(52) U.S. Cl.
CPC ............ *G02C 7/105* (2013.01); *A63B 57/00* (2013.01); *G02C 7/104* (2013.01); *G02C 7/108* (2013.01)

(58) Field of Classification Search
CPC ........ G02C 7/105; G02C 7/104; G02C 7/041; G02C 7/107; G02C 7/108; G02C 7/06; G02C 7/065

USPC ......................................................... 351/44
See application file for complete search history.

(56) References Cited

U.S. PATENT DOCUMENTS

| | | | | |
|---|---|---|---|---|
| 4,891,046 A * | 1/1990 | Wittmann | ........ | B29D 11/00317 8/507 |
| 6,250,759 B1 * | 6/2001 | Kerns, Jr. | ............. | G02C 7/104 351/159.41 |
| 2011/0141432 A1 * | 6/2011 | Nesty | ..................... | G02C 7/105 351/44 |

* cited by examiner

*Primary Examiner* — Kristina M Deherrera
(74) *Attorney, Agent, or Firm* — Rutan & Tucker, LLP; Kyle M. St. James (57) ABSTRACT

A multi-colored lens for eyewear is disclosed. The lens includes a plurality of segments including a lower segment coated with a blue dye, an upper segment coated with a red/orange dye and middle segment serving to transition between the blue and red/orange dyes. The multi-colored lens provides numerous advantages as a golf aid in assisting the wearer to view the ball. The lower blue segment assists a wearer in viewing a golf ball against a green surface while the upper red/orange segments assists the wearer in viewing the golf ball against a blue or gray sky.

14 Claims, 11 Drawing Sheets
(1 of 11 Drawing Sheet(s) Filed in Color)

MULTI-COLORED LENS CONFIGURED AS A GOLF AID

CROSS-REFERENCE TO RELATED APPLICATIONS

This application claims the benefit of priority to U.S. Provisional Application No. 62/636,749, filed Feb. 28, 2018, and to U.S. Provisional Application No. 62/718,998, filed Aug. 10, 2018, the entire contents of both are incorporated by reference herein.

FIELD

Embodiments of the disclosure relate to the field of eyewear. More specifically, one embodiment of the disclosure relates to multi-colored lenses for eyewear configured to aid a wearer in maintaining eye contact with a golf ball.

GENERAL BACKGROUND

Since its inception as a sport in the 15$^{th}$ century, golf has provided a vast amount of entertainment to millions of players. The game of golf is centered on the simple concept of hitting a golf ball from a tee into a cup in the fewest number of shots possible. Each "hit" is typically referred to as a "stroke." Most often, golf is played as an individual sport with each golfer hitting their ball repeatedly starting from a tee box until the golfer hits the ball in a corresponding cup. The area from the tee box to the cup is referred to as a "hole" and a golf course is typically comprised of 18 holes.

Golfers often play the game of golf in sets of four, called "foursomes," and typically record their own score for each hole, although team formats exist. Upon completion by each player of 18 holes, e.g., completion of a round, the winner may be deemed the golfer with the lowest number of strokes for the round. While there are alternative methods for scoring each round and determining a winner, each scoring method is based on the concept that the lowest number of stroke wins.

Based on the fact that the goal of golf is to complete each round in the lowest number of strokes, golfers are continually looking for ways to lower their scores. Technological advances have paved the way for improvements for all players over the years including, for example, a move from wooden clubs to steel or metal shafts and/or flex graphite, the development of larger club heads for drivers as well as improvements in the materials used in creating golf balls for increased spin and flight.

Although golfers have turned to numerous devices and technologies aimed at improving one's golf game, these devices typically either distract or frustrate the golfer. In addition, these devices typically aren't permitted during rounds on a golf course and are therefore limited to use during training.

Therefore, what is needed is a device that aids a golfer in improving one's golf game, is not distracting or frustrating to the golfer (or other accompanying golfers) and is permitted for use during a round.

BRIEF DESCRIPTION OF THE DRAWINGS

The patent or application file contains at least one drawing executed in color. Copies of this patent application publication with color drawing(s) will be provided by the Office upon request and payment of the necessary fee.

Embodiments of the disclosure are illustrated by way of example and not by way of limitation in the figures of the accompanying drawings, in which like references indicate similar elements and in which.

DETAILED DESCRIPTION

Certain embodiments and examples are disclosed herein; however, the disclosure is not intended to be so limited and the inventive concept naturally extends beyond the specific recited embodiments. As a result, the scope of the claims should not be limited by any particular embodiment described herein. For instance, with respect to any method or process discussed below, the operations of the method or process can be performed in any suitable order and/or may be optional.

I. Overview Summary

Embodiments of eyewear including one or more multi-colored lenses are described. In addition, methods of application of one or more coatings to the lenses of eyewear are described. Specifically, the eyewear described may be configured to aid in a wearer's ability to maintain eye contact with a ball or other object utilized in a sporting activity.

The term "eyewear" may generally refer to a frame that holds one or more lenses through which a wearer looks. Examples of eyewear include but are not limited to eyeglasses ("glasses"), corrective glasses, reading glasses, sunglasses, In one embodiment, an eye glass apparatus includes a pair of lenses that are multi-colored. In one embodiment, the lenses are created by using the entire color spectrum vertically and horizontally to create a distinct targeting pattern on the lenses. In some embodiments, the multi-colored pattern on the lenses ranges across the color spectrum from the colors blue to red, including the colors there between. In some embodiments, a bottom portion of a lens is blue and an upper portion of the lens is red with the lens transitioning from blue to red utilizing additional colors there between.

The distinct multi-color pattern provides several advantages as will be discussed herein and illustrated in the accompanying figures. In one embodiment, the lenses are configured to be utilized in eyewear worn while playing golf. The distinct multi-color pattern is configured to encourage the golfer wearing the eyewear to maintain a particular positioning of his head while addressing a golf ball and during his swing. While encouraging the golfer to maintain a particular head positioning, the distinct pattern encourages the golfer to maintain eye contact with the golf ball.

As will be discussed below, by viewing the golf ball through the blue portion of the lenses while addressing a golf ball and during one's swing, the distinct multi-color pattern forces the golfer to maintain the correct head positioning, e.g., one's chin separated from the neck/chest. Specifically, the distinct multi-color pattern is configured so that when the golfer moves his head while addressing the golf ball or during his swing, the golfer will then view the golf ball through a non-blue portion of the lenses. The golfer is then aware that he has moved his head and should stop swinging.

As all golfers know, maintaining one's head positioning while addressing a golf ball and during one's swing is integral in maintaining eye contact as well as proper form. Thus, the distinct multi-color pattern of the lenses disclosed herein significantly aids a golfer in maintaining proper positioning of his head, which in turn aids the golfer in maintaining eye contact as well as proper form while swinging the golf club.

A second advantage provided by the lenses having disposed thereon the distinct multi-color pattern is the ability of the golfer to more clearly see the golf ball after hitting the ball. Upon hitting the golf ball, it is often difficult to follow the ball as it travels due to the lack of contrast between a white golf ball and the light blue or white sky. Therefore, it is common for golfers to lose sight of their ball and/or be forced to rely on others to follow their ball. However, such practices are not ideal, and often result in lost golf balls, especially when playing alone. Further, upon losing a golf ball, a golfer is forced to take a "drop," which negatively impacts the golfer's score. However, in the embodiment in which the upper portion of the lenses are red, a golfer views the flight of the golf ball through the red coloring, which creates a color contrast between the golf ball (which now appears as a dark color, e.g., black) and the sky (which now appears red).

In some embodiments, the distinct multi-color pattern of the lenses may be configured for alternative activities including baseball, hockey, croquet, racquetball or any sporting activity that requires a player to strike or hit a ball with an object, such as a club, stick or bat.

In some embodiments, the distinct multi-color pattern may be disposed on prescription lenses. However, in other embodiments, the distinct multi-color pattern may be disposed on non-prescription lenses.

II. Terminology

In the following description, certain terminology is used to describe various features of the invention. For example, the term "characteristic" refers to a feature or quality of an object that may be observable by means of sight, smell, hearing, taste and/or touch. Characteristics may include attributes, qualities, properties, traits, aspects or elements of object that, when taken collectively, may identify an object. The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. Illustrative Embodiments

Figure 1A:
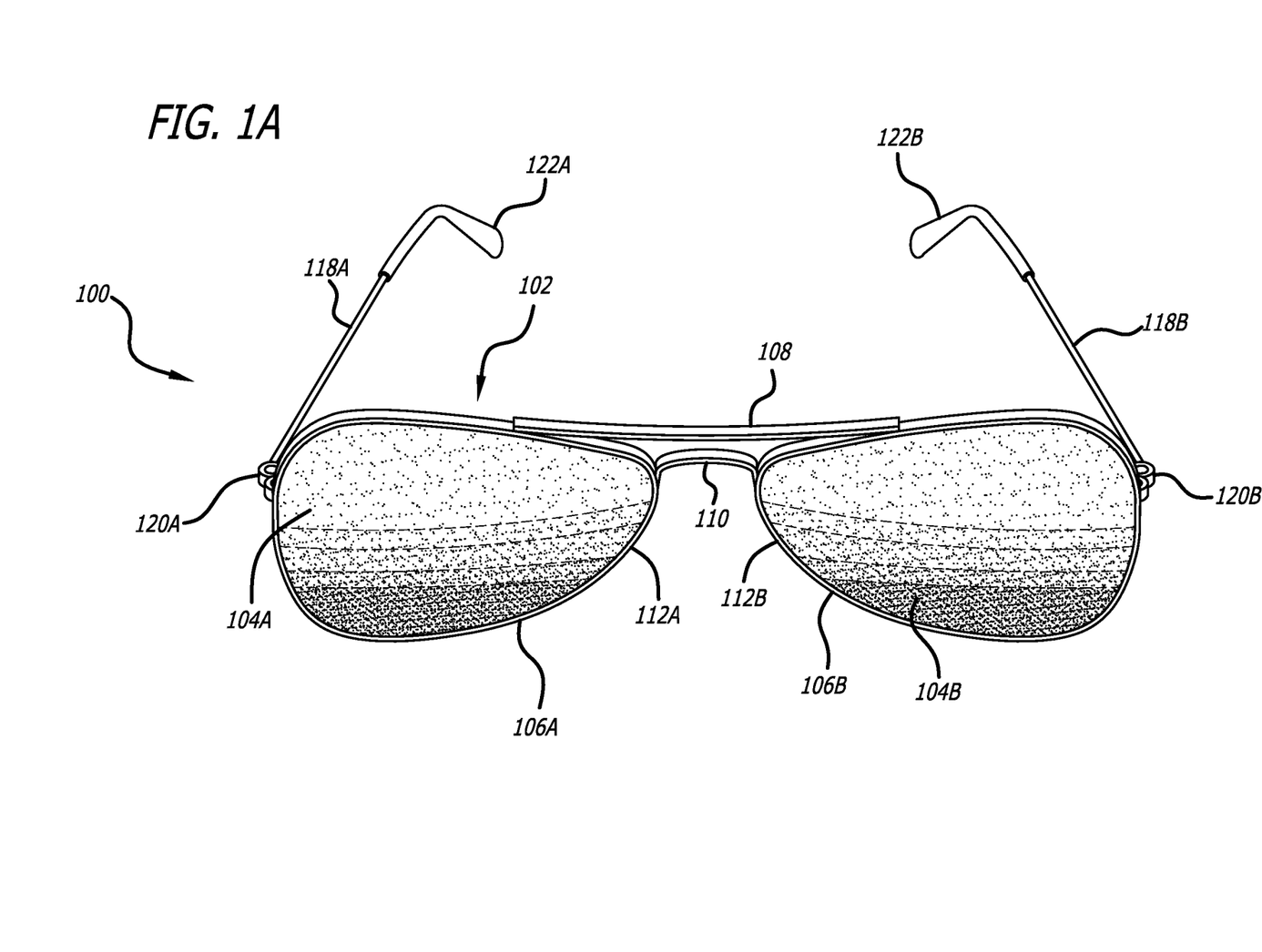
FIG. 1A is a front perspective of an exemplary embodiment of eyewear having multi-colored lenses in accordance with some embodiments.

Referring to FIG. 1A, a front perspective of an exemplary embodiment of eyewear having multi-colored lenses is shown in accordance with some embodiments. Herein, the eyewear 100 ("glasses 100") includes a frame 102 and lenses 104A-104B. The frame 102 includes a pair of rim portions 106A-106B that are configured to hold the lenses 104A-104B in a predetermined position. In some embodiments, the lenses 104A-104B may be inserted into the rim portions 106A-106B and held in place via a groove in each of the rim portions 106A-106B or with an adhesive such as glue. The lenses 104A-104B may be formed of one of a plurality of materials, including but not limited or restricted to, polycarbonate, Trivex, high-index plastic and/or glass. In some embodiments, the lenses 104A-104B may be tinted or photochromic (e.g., the lenses darken or lighten automatically based on exposure to light, e.g., ultraviolet (UV) radiation). In other embodiments, the lenses 104A-104B may be aspheric lenses (e.g., surface profiles are not portions of a sphere or cylinder).

Figures 5A, 5B:
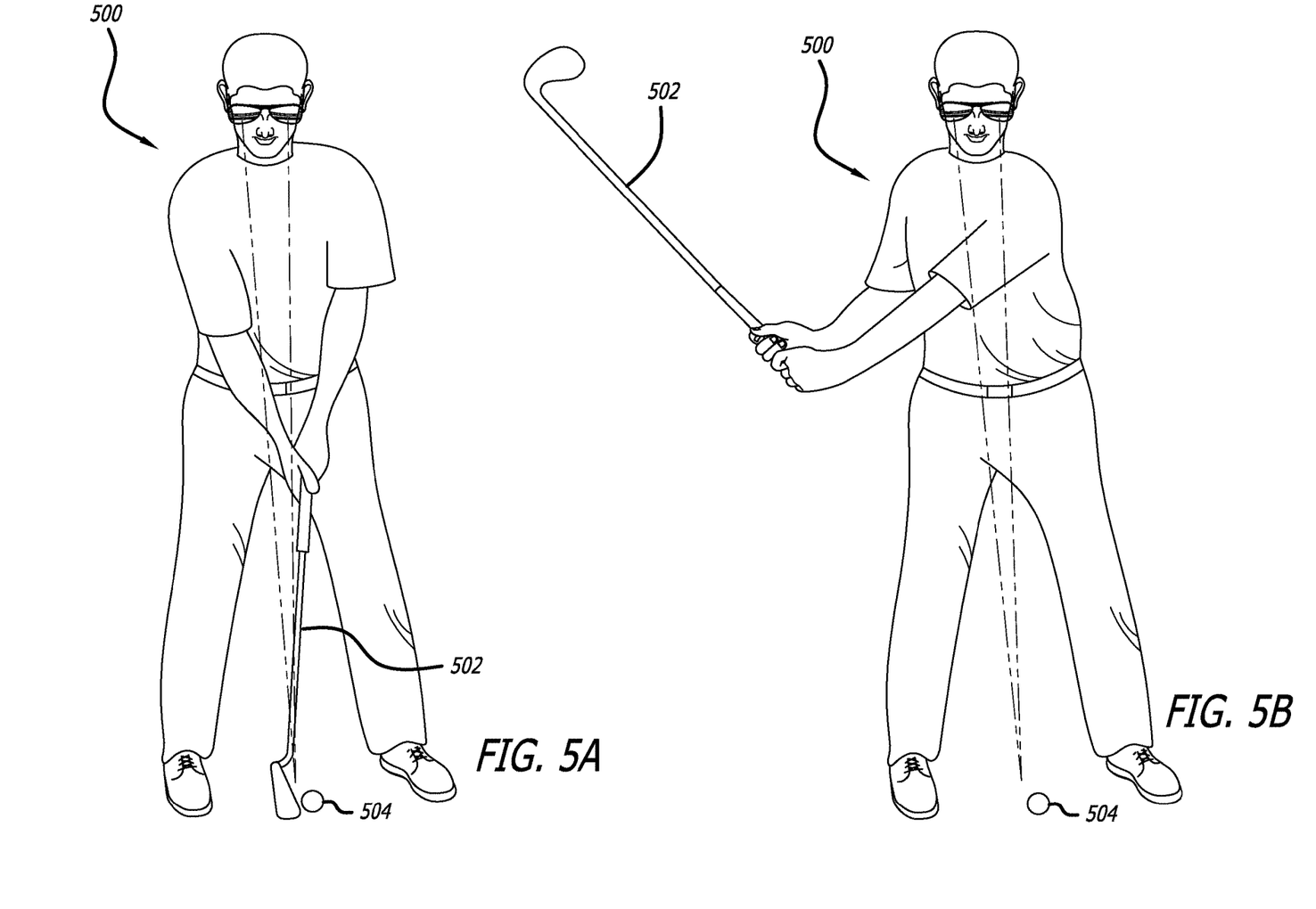
FIG. 5A is a perspective view illustrating a golfer addressing a golf ball while wearing eyewear having multi-colored lenses in accordance with some embodiments.
FIG. 5B is a perspective view illustrating a golfer during a backswing while wearing eyewear having multi-colored lenses in accordance with some embodiments.
Figure 5C:
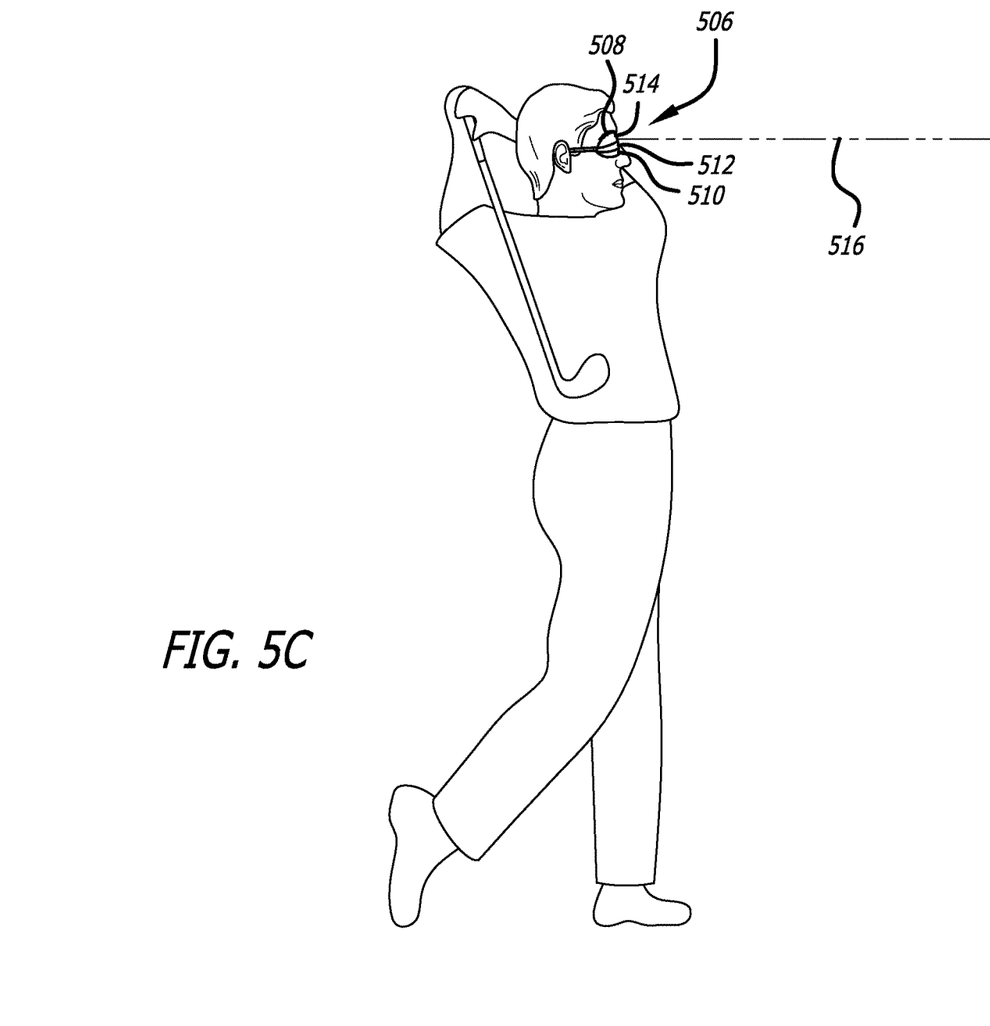
FIG. 5C is a perspective view illustrating a golfer holding a follow-through of a swing after hitting a golf ball while wearing eyewear having multi-colored lenses in accordance with some embodiments.

As is apparent from the illustration of FIGS. 1A-1D, the lenses 104A-104B include a pattern disposed thereon, e.g., a multi-colored pattern, resulting for the application of a coating. As will be discussed in detail below, especially with respect to FIG. 6, the coating process may include the dipping each of the lenses 104A-104B into the coating being in a liquid form in order to create the pattern. The disposition of the multi-colored pattern on the lenses 104A-104B has the functionality of operating as a visual aid for sporting activities, including golf, and provides numerous benefits. In one embodiment, each segment of color within the multi-colored pattern performs a specific functionality when a golfer is wearing the glasses 100. As is illustrated in FIGS. 5A-5C and discussed further below, when a golfer is addressing a golf ball and during the golfer's swing, the glasses 100 aid the golfer by providing a visual indication that the golfer is maintaining proper head positioning, which in turns aids the golfer in maintaining eye contact with the golf ball. Specifically, with reference to FIG. 1D, the segments 124, 126 and 128 are configured and shaped such that the golfer will view the golf ball through the segment 124 when the golfer's head remains in the proper position and will view the ball through either segments 126-128 when the golfer's head moves from the proper position.

Figure 1B:
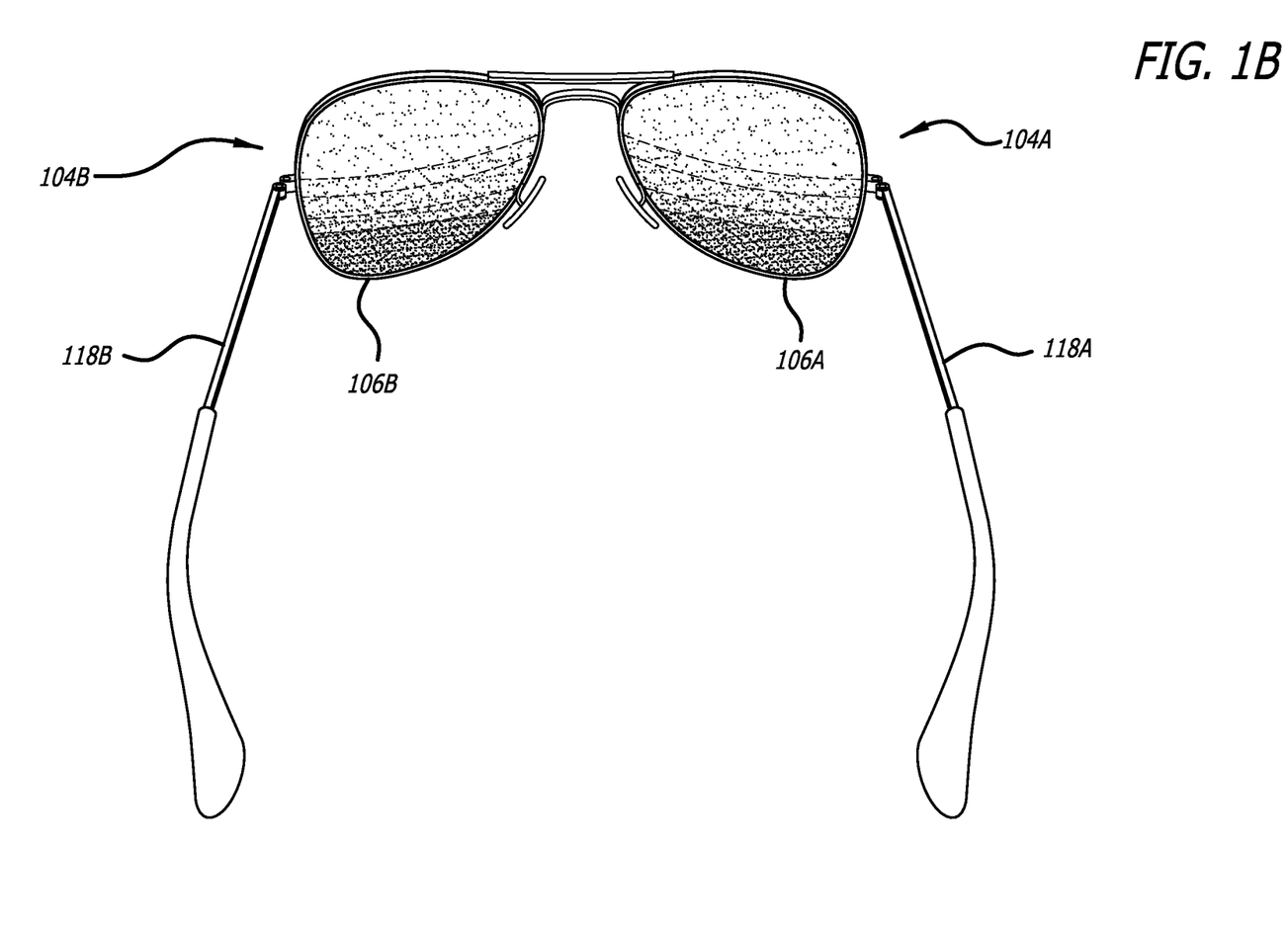
FIG. 1B is a rear perspective of the eyewear of FIG. 1A having multi-colored lenses in accordance with some embodiments.

In addition, after hitting the ball and turning one's head to track the trajectory of the ball, the glasses 100 provide a visual aid in maintaining sight of the ball. Specifically, the segment 126 is configured and shaped such that upon raising one's head after striking the ball, the golfer will view the sky, and hence the trajectory of the ball, through the segment 128. The coloring of the segment 128 has the functionality of creating a contrast between the light colored sky and the golf ball. For example, in the embodiment in which the segment 128 has a red-orange color, the sky is seen by the golfer as having a red-orange color and the golf ball is viewed as a dark color (e.g., black); thus, the golfer can easily maintain sight of the trajectory of the golf ball.

Still referring to FIG. 1D, the segment 126 is configured and shaped to provide a "transition" area between the segment 124 and the segment 128. Specifically, the coloring of the segment 126 transitions from the color of the segment 124 to the color of the segment 128 (or vice-versa). Such a configuration prevents a direct transition, e.g., a "hard" line, between contrasting colors, which when disposed on lenses, often causing headaches or trouble visualizing objects for the wearer.

Referring back to FIG. 1A, the rim portions 106A-106B are coupled together via a brow bar 108 (or a "top bar") and/or a bridge 110. The brow bar 108 is configured to extend from the top of so that the positioning of the rim portions 106A-106B and lenses 104A-104B is maintained in a constant manner. In some embodiments, the brow bar 108 extends across the top of the bridge 110. It should be noted that the brow bar 108 is an optional feature and its presence may be dependent on the style of the eyewear.

Figure 3:
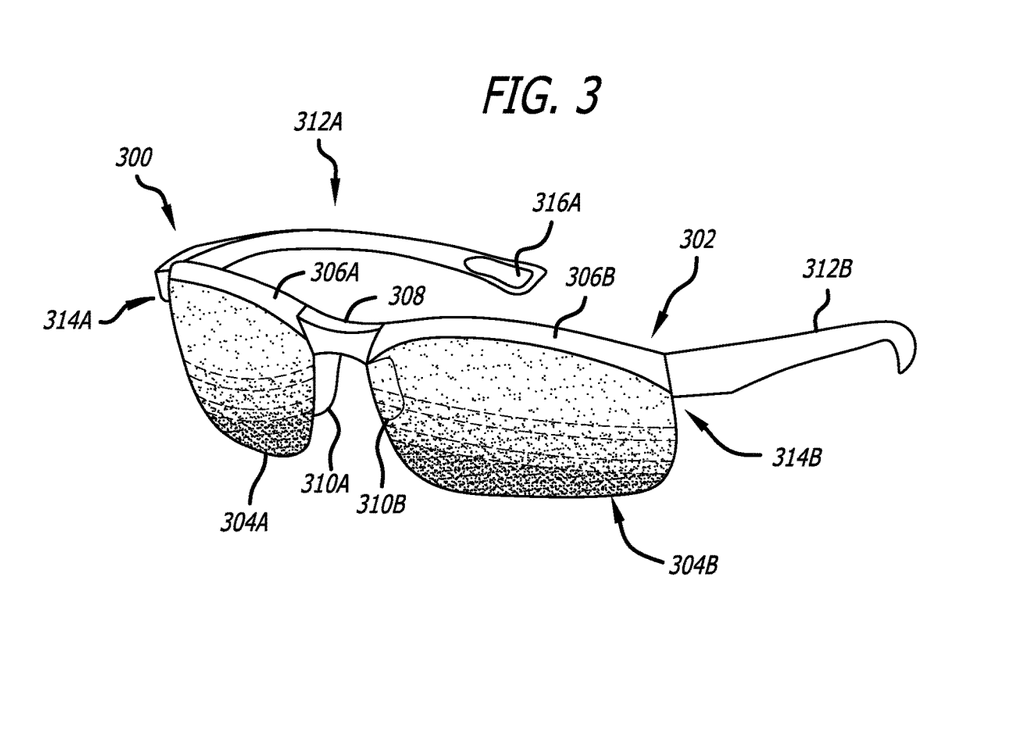
FIG. 3 is a front perspective of a first alternative eyewear having multi-colored lenses in accordance with some embodiments.

The bridge 110 includes a component that also extends from the rim portion 106A to the rim portion 106B to provide stability and support. In addition, an underside of the bridge 110 may rest on the wearer's nose thereby supporting at least a portion of the weight of the glasses 100. In addition, the nose pieces 110A-110B may be coupled to the rim portions 106A-106B. With respect to the nose pieces 110A-110B, each may include a pad arm 114A-114B and a nose pad 116A-116B. The pad arms 114A-114B are configured as attachments that hold the nose pads 116A-116B in a predetermined position. However, in some embodiments, the pad arms 114A-114B may be adjustable so that the glasses 100 may conform to the wearer's nose. In addition, the nose pads 116A-116B may include components configured to assist in maintaining the glasses 100 in a desired position on the wearer's face. Further, the nose pads 116A-116B may be configured to provide comfort for the wearer. In some embodiments, the nose pads 116A-116B may be comprised of various materials, for example, plastic or rubber. In other embodiments, alternative forms of nose pieces may be included and may be integrally formed with the frame 102, as illustrated in FIG. 3.

Additionally, the frame 102 includes arms 112A-112B (or "temples") that couple to the rim portions 104A-104B via end pieces 120A-120B and extend over the ears of the wearer to help hold the glasses 100 in place. The end pieces 120A-120B may include, or alternatively, couple to a set of hinges that enable the arms 118A-118B to fold inward when not being worn by the wearer. In some embodiments, the hinges may be spring hinges, which provide for hyperextension of the arms 118A-118B. Finally, the frame 102 may include a set of earpieces 116A-116B (or "temple tips"). In one embodiment, each earpiece 116A-116B may include a plastic coating that covers the portion of the arm 118A-118B that rests on top of the ears of the wearer. In some embodiments, each lens 118A-118B may be comprised of a plastic or polycarbonate material. Referring to FIG. 1B, a rear-side perspective of the eyewear of FIG. 1A having multi-colored lenses is shown in accordance with some embodiments. The illustration of FIG. 1B provides a view of the nose pieces 104A-104B that explicitly shows the pad arms 114A-114B and the nose pads 116A-116B.

Figure 1C:
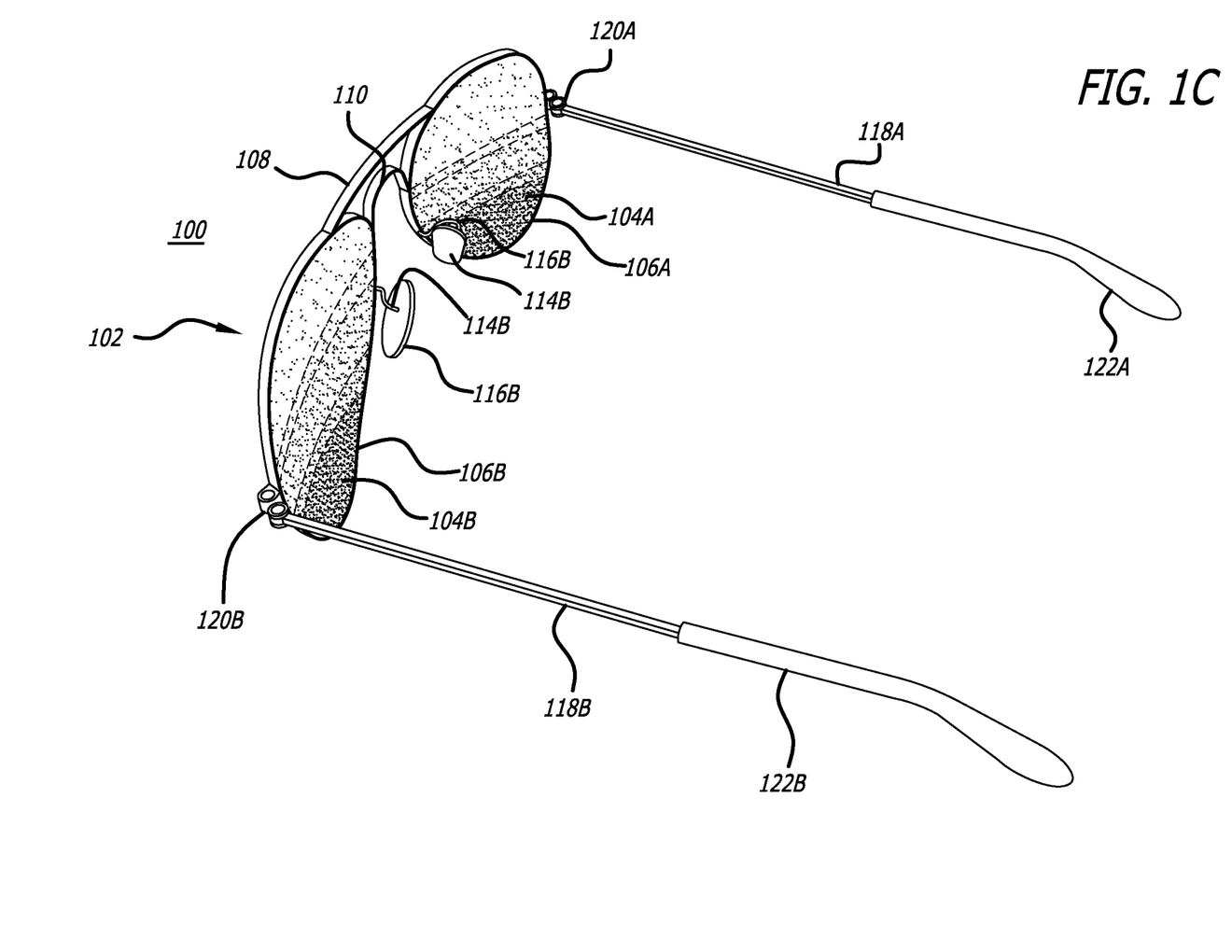
FIG. 1C is a rear-side perspective of the eyewear of FIG. 1A having multi-colored lenses in accordance with some embodiments.
Figure 1D:
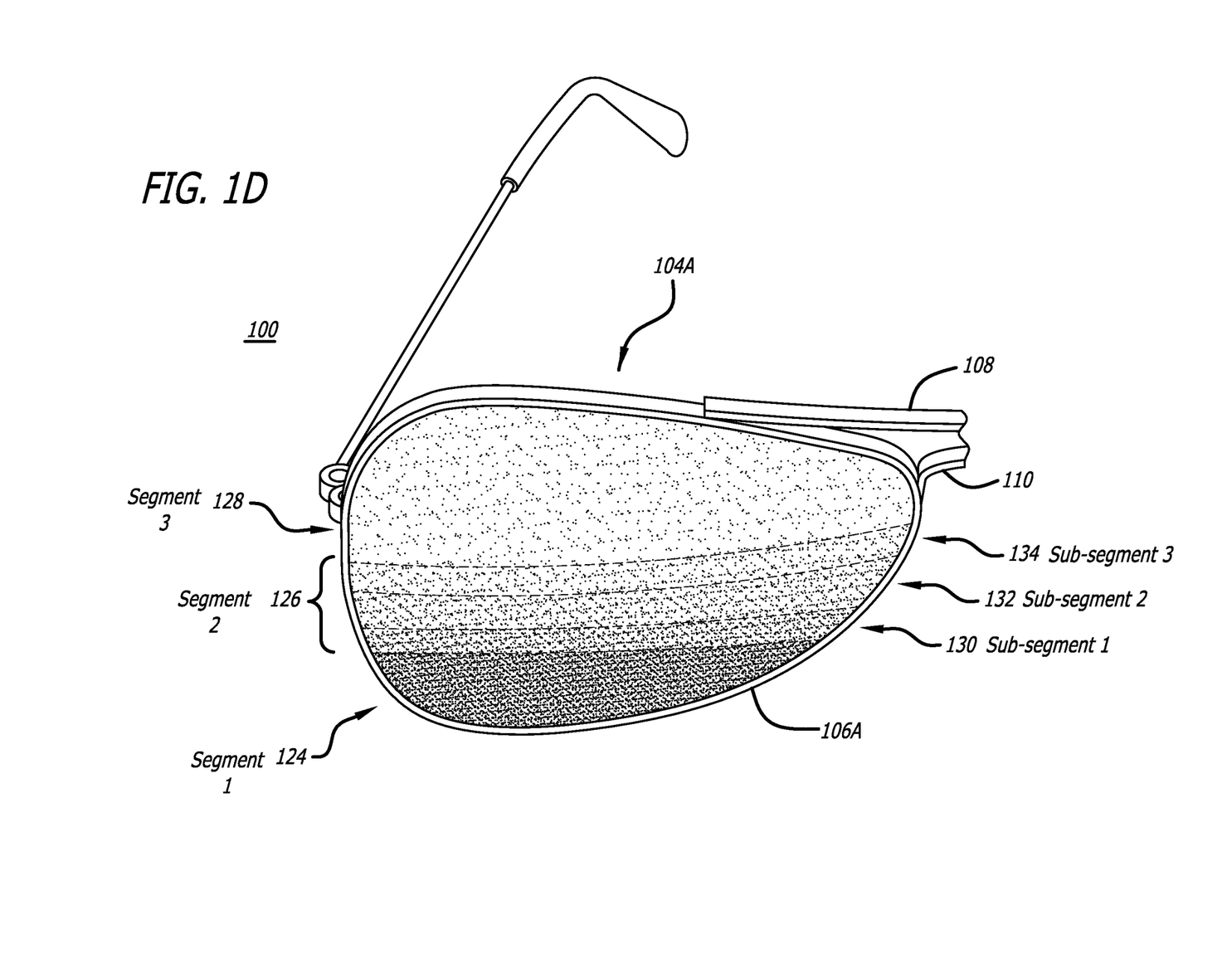
FIG. 1D is a front perspective of a first lens of the eyewear of FIG. 1A having multi-colored lenses in accordance with some embodiments.

Referring now to FIG. 1C, a rear perspective of the eyewear of FIG. 1A having multi-colored lenses is shown in accordance with some embodiments. Specifically, FIG. 1C includes exemplary color segments illustrated on the lenses 104A-104B of the glasses 100. It should be noted that the lines distinguishing the various color segments as seen in FIG. 1C are merely for illustrative purposes and do not actually appear on the lenses 104A-104B. As will be discussed in detail below with respect to FIG. 1D, each color segment has a specific functionality that aids a golfer in maintaining a proper head positioning, and therefore eye contact with a golf ball.

Referring now to FIG. 1D, a front perspective of a first lens of the eyewear of FIG. 1A having multi-colored lenses is shown in accordance with some embodiments. FIG. 1D shows a first lens, e.g., the lens 104A, of the glasses 100 having illustrated thereon a series of lines that partition the lens 104A into a plurality of segments, e.g., "color segments." As stated above, the lines partitioning the lens 104A are merely for illustrative purposes and are not actually present on the lens 104A.

The lens 104A is partitioned into a plurality of color segments with each segment serving a specific purpose in aiding a golfer wearing the glasses 100 to maintain a proper head position. In one embodiment, as illustrated, the lens 104A is partitioned into three color segments 124, 126 and 128, with the segment 126 including a plurality of sub-segments 130, 132 and 134. The segment 126 may be referred to as a "transition segment" representing a portion of the lens 104A that includes a plurality of colors that transition from the color of the bottom segment 124 to the color of the top segment 128. The segment 126 may be divided into more or fewer sub-segments.

The segment 124 aids in a golfer maintaining a proper head position while addressing a golf ball, as seen in FIG. 5A, and while swinging a golf club, as seen in FIG. 5B. Due to the specific configuration and shape of the segment 124, a golfer is forced to maintain a consistent head position if the golfer is to view the ball through the segment 124. Specifically, the proper head position of a golfer when addressing a golf ball and swinging a golf club is to be perpendicular to the golfer's shoulders with the golfer's chin lifted 2-4 inches from his chest. In order for the golfer to view the golf ball through the segment 124 while addressing the ball and swinging a golf club, the golfer must maintain the proper head position. Due to the percentage that the segment 124 extends upward from the lower portion of the lens 104A, when the golfer moves his head from the proper position, the golfer will view the ball through either the segment 126 or the segment 128, which provides a visual indication to the golfer that he moved his head. Such an indication provides the golfer with a signal to stop swinging to avoid likely mishitting the ball.

The segment 128 aids a golfer in at least two facets. First, as described above, when a golfer is addressing a golf ball or swinging a golf club, viewing the ball through the segment 128 acts as an indication to the golfer than he has moved his head from the proper position and should stop swinging and/or readdress the ball. Second, after hitting the ball, the golfer's head naturally moves toward the flight of the ball; however, the ball is often difficult to track. Specifically, the lack of contrast between a white golf ball and a light blue or white sky routinely causes golfers to lose sight of their ball. When wearing eyewear including the lenses 104A-104B, such as the glasses 100, the lack of contrast between the sky and ball is non-existent. When the golfer looks toward the sky to track the flight of the ball, the golfer naturally views the sky through segment 128 due to its configuration. In one embodiment, the segment 128 may be colored red causing the sky to appear red and the golf ball to appear dark (e.g., black). Therefore, while wearing the glasses 100, the golfer is able to track the flight of a golf ball against the sky.

As discussed above, the segment 126 is configured and shaped to provide a "transition" area between the segment 124 and the segment 128. The transition from the color of the segment 124 to the color of the segment 128, as opposed to a hard contrast, is configured to prevent the formation of headaches or visualization trouble for the wearer, which otherwise may occur if the lenses 104A-104B were to have a hard contrast between the colors.

It should be noted that the lenses 104A-104B may vary in thickness. For example, in one embodiment, the thickness of each of the lenses 104A-104B may be approximately 1.0-1.1 mm. In other embodiments, the thickness of each of the lenses 104A-104B may be approximately 1.7 mm. However, the disclosure is not intended to be so limiting and the thickness of the lenses 104A-104B may be dependent on a prescription of the lenses 104A-104B.

Figure 2:
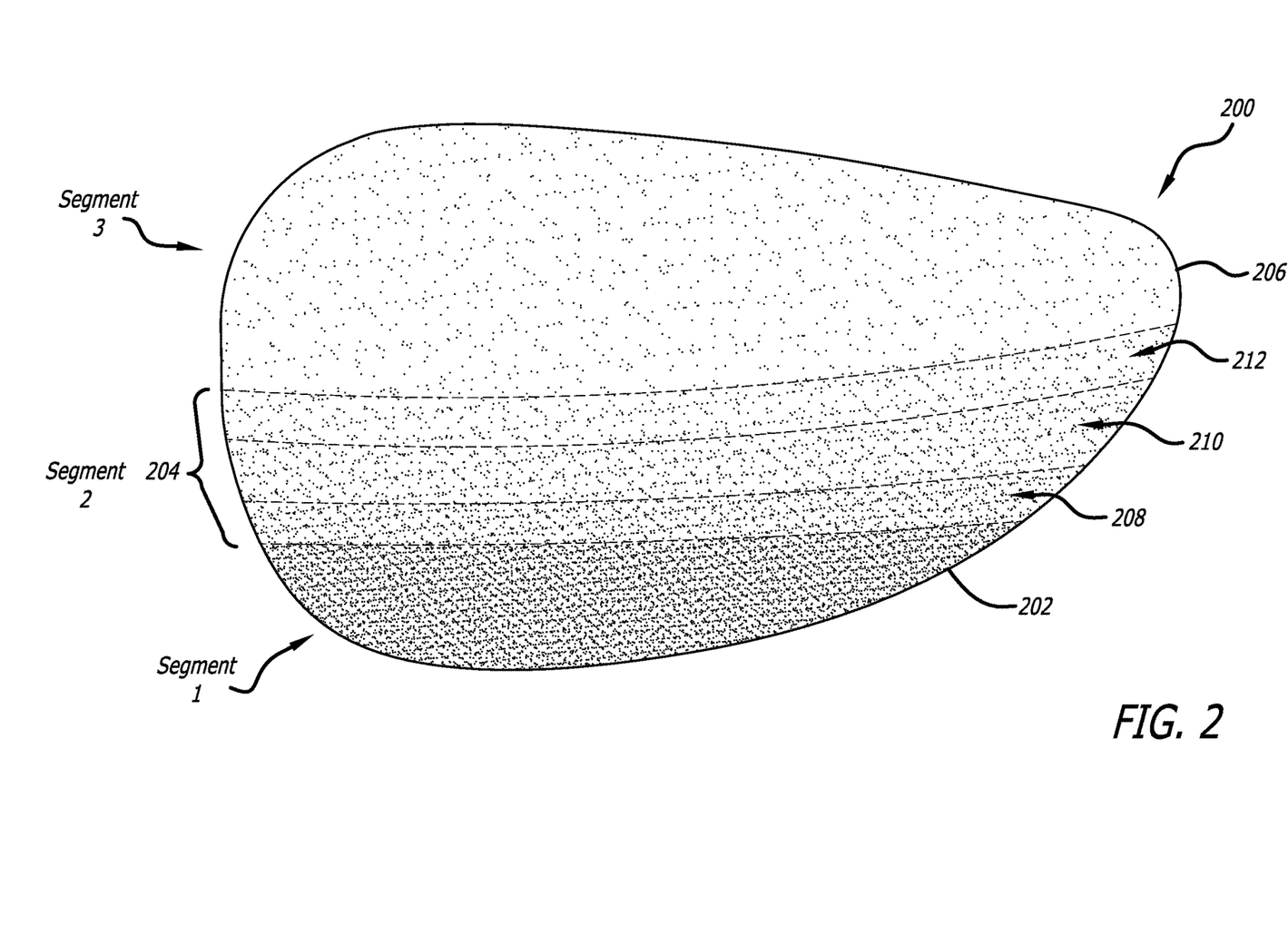
FIG. 2 is a block diagram of an exemplary embodiment of the first lens as seen in FIGS. 1A-1D in accordance with some embodiments.

Referring to FIG. 2, a block diagram of an exemplary embodiment of the first lens as seen in FIGS. 1A-1D is shown in accordance with some embodiments. The illustration of FIG. 2 provides a diagrammatic view of a lens 200 having a pattern disposed thereon. In particular, the lens 200 includes a plurality of segments including the segments 202, 204 and 206. In addition, the segment 204, e.g., a "transition segment" as referred to herein, is shown to include a plurality of sub-segments, including the sub-segments 208, 210 and 212. The segment 202 covering a lower portion of the lens 200 may be coated to be tinted or dyed a first color. In some embodiments, the first color may be blue (e.g., as is known in the color spectrum as having a wavelength range of approximately 450-495 nm and/or a frequency ranging from approximately 670-610 THz).

The segment 206 covering an upper portion of the lens 200 may be coated to be tinted or dyed a second color. In some embodiments, the second color may be a red-orange (e.g., as is known in the color spectrum as having a wavelength range of approximately 590-750 nm and/or a frequency ranging from approximately 505-400 THz).

Furthermore, the segment 204 may be coating to be tinted or dyed a plurality of colors. For example, the segment 204 may be created by the blending of the first color and the second color. As is discussed below, the lens 200 may be dipped in a plurality of liquids to apply the coating. During the coating process, the first color may blend with the second color, thereby creating the coloring of the segment 204. As is illustrated in FIG. 2, a plurality of sub-segments may be utilized to describe the blending of the colors. For example, the sub-segment 208 may include a blend of the first color and the second color, wherein a majority of the blend is the first color. The sub-segment 210 may include approximately an even blend of the first color and the second color. Further, the sub-segment 212 may include a blend of the first color and the second color, wherein a majority of the blend is the second color.

Referring to FIG. 3, a front perspective of a first alternative eyewear having multi-colored lenses is shown in accordance with some embodiments. Herein, the eyewear 300 ("glasses 300") includes a frame 302 and lenses 304A-304B. The frame 302 includes a pair of rim portions 306A-306B that are configured to hold the lenses 304A-304B in a predetermined position. In some embodiments, the lenses 304A-304B may be inserted into a groove of the rim portions 306A-306B and held in place with an adhesive such as glue.

The lenses 304A-304B may be formed of one of a plurality of materials, as discussed above with respect to lenses 104A-104B. Similarly, in some embodiments, the lenses 304A-304B may be tinted, photochromic and/or aspheric. Similarly to the embodiment illustrated in FIGS. 1A-1D, the lenses 304A-304B of the glasses 300 include a multi-colored pattern disposed thereon having the same benefits and functionality as discussed above.

It should be noted that the embodiment of FIG. 3 illustrates that the multi-colored pattern may be disposed on lenses coupled to frames that do not form a complete boundary, e.g., a border, around the lenses. Specifically, the frames 302 includes rim portions 306A-306B that coupled to an upper portion of each of the lenses 304A-304B. In contrast, the rim portions 106A-106B of FIGS. 1A-1D form a complete boundary around the lenses 104A-104B.

Figure 4:
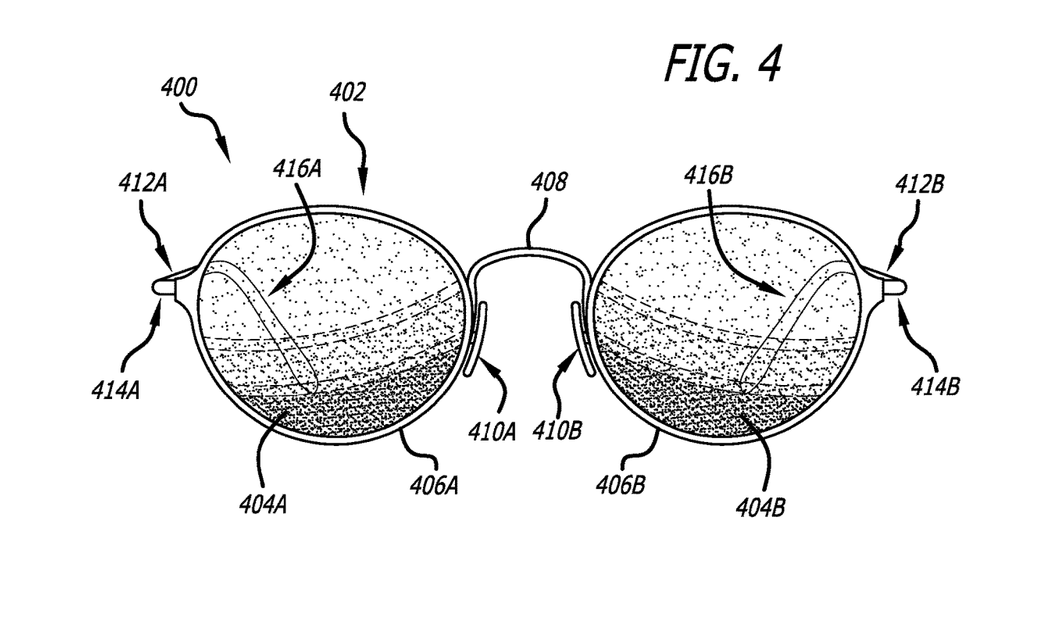
FIG. 4 is a front perspective of a second alternative eyewear having multi-colored lenses in accordance with some embodiments.

Referring now to FIG. 4, a front perspective of a second alternative eyewear having multi-colored lenses is shown in accordance with some embodiments. Herein, the eyewear 400 ("glasses 400") includes a frame 402 and lenses 404A-404B. The frame 402 includes a pair of rim portions 406A-406B that are configured to hold the lenses 404A-404B in a predetermined position. In some embodiments, the lenses 404A-404B may be inserted into a groove of the rim portions 406A-406B and held in place with an adhesive such as glue.

The lenses 404A-404B may be formed of one of a plurality of materials, as discussed above with respect to lenses 104A-104B and 304A-304B. Similarly, in some embodiments, the lenses 404A-404B may be tinted, photochromic and/or aspheric. As is also seen in the embodiments illustrated in FIGS. 1A-3, the embodiment illustrated in FIG. 4, the lenses 404A-404B of the glasses 400 include a multi-colored pattern disposed thereon having the same benefits and functionality as discussed above.

Based at least on the shapes and forms illustrated in the embodiments of FIGS. 1-4, the disclosure of lenses having a multi-colored pattern disposed thereon and the process of applying the multi-colored pattern is not intended to be limited to a particular shape of frames and/or lenses. In fact, the multi-colored pattern disclosed herein may be disposed on any shape of lens and utilized with any form of frames.

Referring to FIG. 5A, a perspective view illustrating a golfer addressing a golf ball while wearing eyewear having multi-colored lenses is shown in accordance with some embodiments. The golfer 500 is seen as addressing the golf ball 504, which may refer to a player standing near the ball 504 and placing his club 502 on the ground immediately in front of or behind the golf ball 504. In particular, the golfer 500 is wearing the glasses 506 having lenses 508 and 510. Each of the lenses 508 has a pattern disposed thereon that includes a plurality of segments corresponding to a particular color as discussed above. Specifically, the illustration of FIG. 5A depicts the golfer 500 having his head in the proper position and, as a result, viewing the golf ball 504 through the segment 510, i.e., through the lower segment of the lenses 508 (i.e., sight lines 516 illustrate the view of the golfer 500).

Referring to FIG. 5B, a perspective view illustrating a golfer during a backswing while wearing eyewear having multi-colored lenses is shown in accordance with some embodiments. The golfer 500 is now seen during his backswing. Similarly to FIG. 5A, the golfer 500 is depicted in FIG. 5B as having his head in the proper position and, as a result, viewing the golf ball 504 through the segment 510. Thus, the glasses 506 provide the specific benefit of supplying a visual indication (i.e., viewing the ball through the color of the segment 510) to the golfer 500 that he has maintained his head in the proper position (e.g., not moved his head), and thus maintained eye contact with the ball 504. In addition, the glasses 506 provides a second visual indication (i.e., viewing the ball through the color of either the segment 512 or 514) to the golfer 500 when he has moved his head from the proper position, which alerts the golfer 500 of such a mistake and indicates to the golfer 500 that he should stop his swing and readdress the golf ball 504.

Referring to FIG. 5C, a perspective view illustrating a golfer holding a follow-through of a swing after hitting a golf ball while wearing eyewear having multi-colored lenses is shown in accordance with some embodiments. Upon hitting the golf ball 504, the golfer 500 naturally moves his head in an upward manner to follow the trajectory of the ball 504; thus, the sight line 516 of the golfer 500 is seen as traveling through the upper portion of the lenses 508, e.g., the segment 514. As discussed above, a coating having a second color is disposed on the segment 514, which may be red for example, and provides the benefit of creating a contrast for the golfer 500 between the sky and the ball 504. Therefore, as the golfer 500 moves his head to follow the trajectory of the golf ball 504, the golfer 500 is easily able to maintain sight of the ball 504. In contrast, when not wearing the glasses 506, the golfers often quickly lose sight of the ball 504 due to the lack of contrast between the light colored sky and a white golf ball.

Figure 5D:
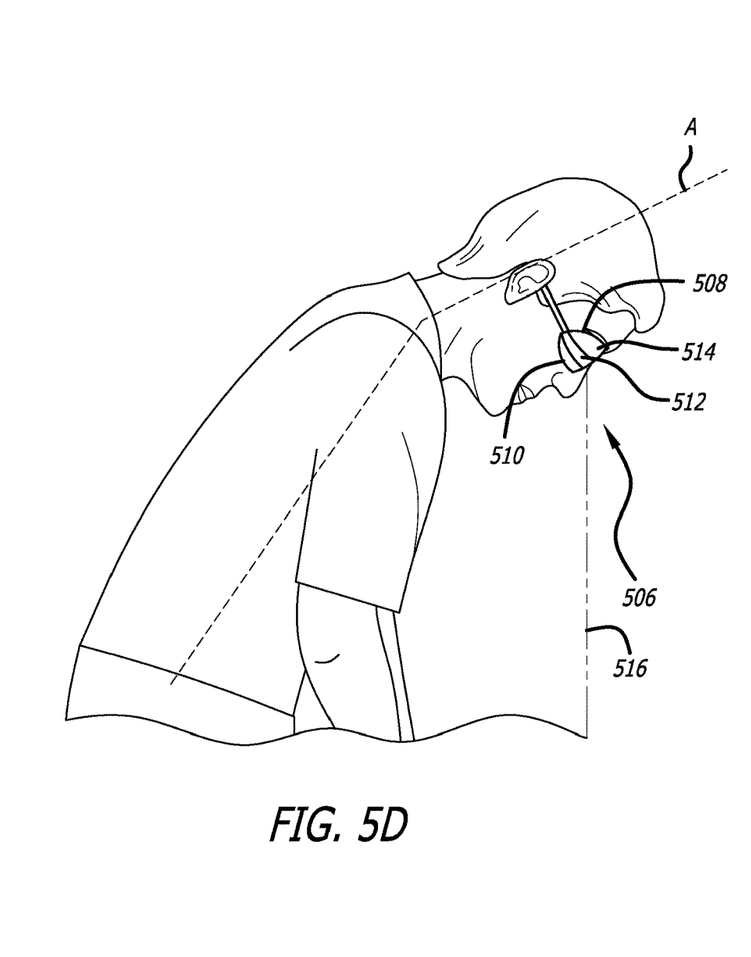
FIG. 5D is a side perspective view illustrating a golfer wearing eyewear having multi-colored lenses having an improper positioning of his head in accordance with some embodiments.
Figure 5E:
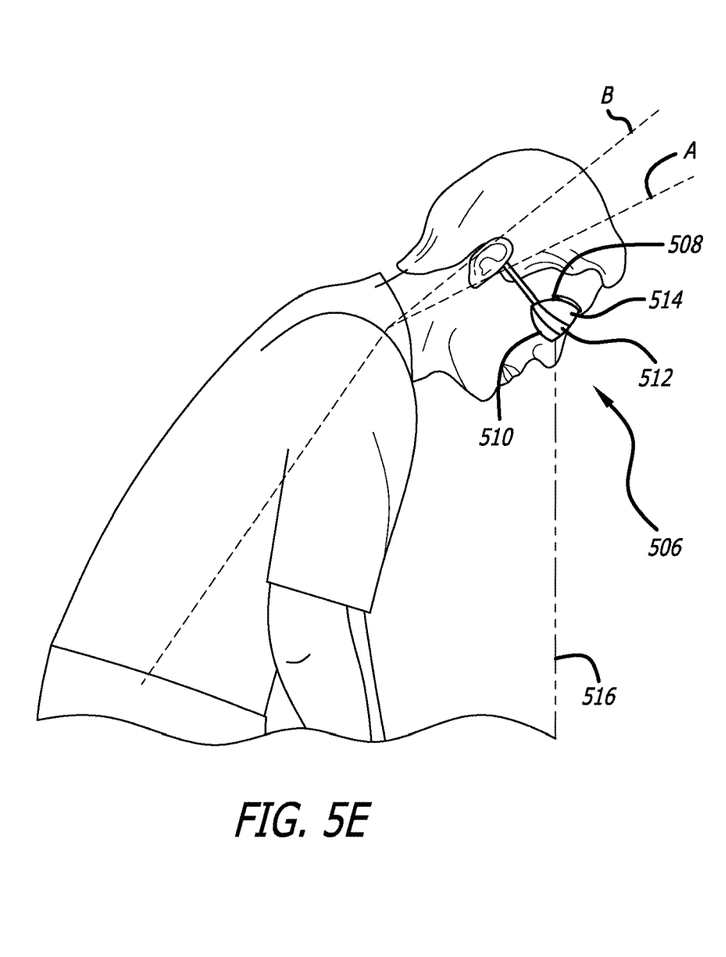
FIG. 5E is a side perspective view illustrating a golfer wearing eyewear having multi-colored lenses having a proper positioning of his head in accordance with some embodiments.

Referring now to FIG. 5D, a side perspective view illustrating the golfer 500 of FIGS. 5A-5C wearing eyewear having multi-colored lenses having an improper positioning of his head is shown in accordance with some embodiments. The golfer 500 is seen having his head positioned improperly as indicated by this sight line 516 is directed through the segment 512. As discussed above, the glasses 506 are configured such that the sight line of the golfer 500, when having his head positioned properly, will be directed through the segment 510. Referring to FIG. 5E, a side perspective view illustrating the golfer 500 of FIGS. 5A-5C wearing eyewear having multi-colored lenses having a proper positioning of his head is shown in accordance with some embodiments. In contrast to FIG. 5D, the sight line 516 of the golfer 500 is directed through the segment 510. Therefore, the glasses 506 provide a visual indication, e.g., viewing the golf ball through the color of the segment 510, to the golfer that his head is positioned properly. The change in the positioning of the head of the golfer 500 is shown in FIG. 5E via the posture B as compared to the posture A, as seen in FIG. 5D.

Figure 6:
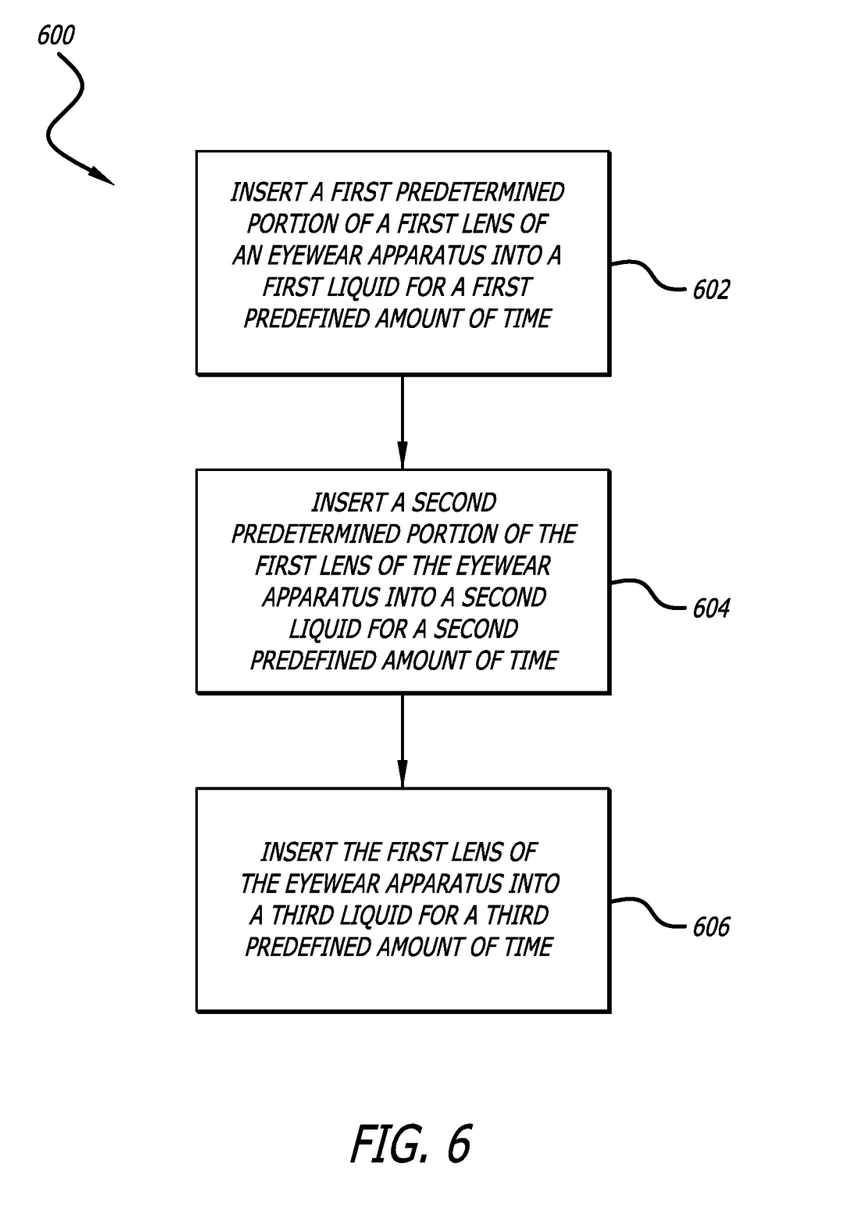
FIG. 6 is an exemplary flowchart illustrating the operations of applying a coating to a lens to dispose a multi-colored pattern thereon is shown in accordance with some embodiments.

Referring to FIG. 6, an exemplary flowchart illustrating the operations of applying a coating to a lens to dispose a multi-colored pattern thereon is shown in accordance with some embodiments. Each block illustrated in FIG. 6 represents an operation performed in the method 600 of performing an application of a coating to a lens. Herein, a first operation performed in the method 600 may include inserting a first predetermined portion of a first lens of an eyewear apparatus into a first liquid for a first predefined amount of time (block 602). In one embodiment, the first liquid may be comprised of a first water-soluble dye or tint dissolved in water. Specifically, the first water-soluble dye or tint may be dissolved in 1 quart of water heated to a temperature range of 200°–210° F. (93.3-98.8° C.), wherein in one embodiment, the temperature is 205° F. In one embodiment, the first water-soluble dye or tint may be a combination of an amount of a red tint or dye and an amount of an orange tint or dye. In one embodiment, the first water-soluble dye or tint may be comprised of: (1) 3 ounces of BPI® molecular catalytic tint #31900 ("Red"), and (2) 1.5 ounces of BPI® molecular catalytic tint #31700 ("Orange"). In one embodiment, a predetermined percentage of an upper portion of a lens is dipped into the first liquid for a period of time ranging from 60-180 minutes. In one embodiment, the range may be 90-120 minutes. In some embodiments, the percentage of the upper portion of the lens that is dipped into the first liquid may range from 55-80% of the lens. In some embodiments, the range is from 60-70% and in one embodiment, 67% of the upper portion of the lens is dipped into the first liquid.

A second operation performed in the method 600 includes inserting a second predetermined portion of the first lens of the eyewear apparatus into a second liquid for a second predefined amount of time (block 604). In one embodiment, the second liquid may be comprised of a second water-soluble dye or tint dissolved in water. Specifically, the first water-soluble dye or tint may be dissolved in 1 quart of water heated to a temperature range of 200°–210° F. (93.3-98.8° C.), wherein in one embodiment, the temperature is 205° F. In one embodiment, the second water-soluble dye or tint may be a blue dye, and may be an amount within the range of 1/16 ounce to 1/2 ounce of C250-50 Opti-Safe® Lens Dye ("Blue"). In one embodiment, the amount may specifically be 1/8 of an ounce. In one embodiment, a predetermined percentage of a lower portion of the lens is dipped into the second liquid for a period of time ranging from 10-30 minutes. In one embodiment, the lower portion of the lens may be dipped in the second liquid for a period of 20 minutes. In some embodiments, the percentage of the lower portion of the lens that is dipped into the second liquid may range from 20-35% of the lens. In some embodiments, the range is from 25-31% and in one embodiment, 29% of the lower portion of the lens is dipped into the second liquid.

It should be noted that a transition segment is formed between the first segment (i.e., upper portion) and the second segment (i.e., lower portion). The coloring of the coating of the transition segment is formed by the blending of the coloring of the first segment and the second segment. Specifically, as the second segment is dipped into the second liquid and pulled out of the second liquid, the colors of the first segment and second segment blend together. In some embodiments, the transition segment may range from 2-8% of a middle portion of the lens formed between. In yet some embodiments, the range of transition segment may be 4-6% and in one embodiment, the transition segment may cover 4% of the lens between the first segment and the second segment.

Furthermore, a third operation performed in the method 600 includes inserting the first lens of the eyewear apparatus into a third liquid for a third predefined amount of time (block 606). In some embodiments, the third liquid is cool water, which may be, for example, ranging in temperature from 35-50° F. The lens may be dipped in the third liquid for a time period ranging from, in some embodiments, 2-10 minutes. In some embodiments, the time period may be 5 minutes.

Figure 7:
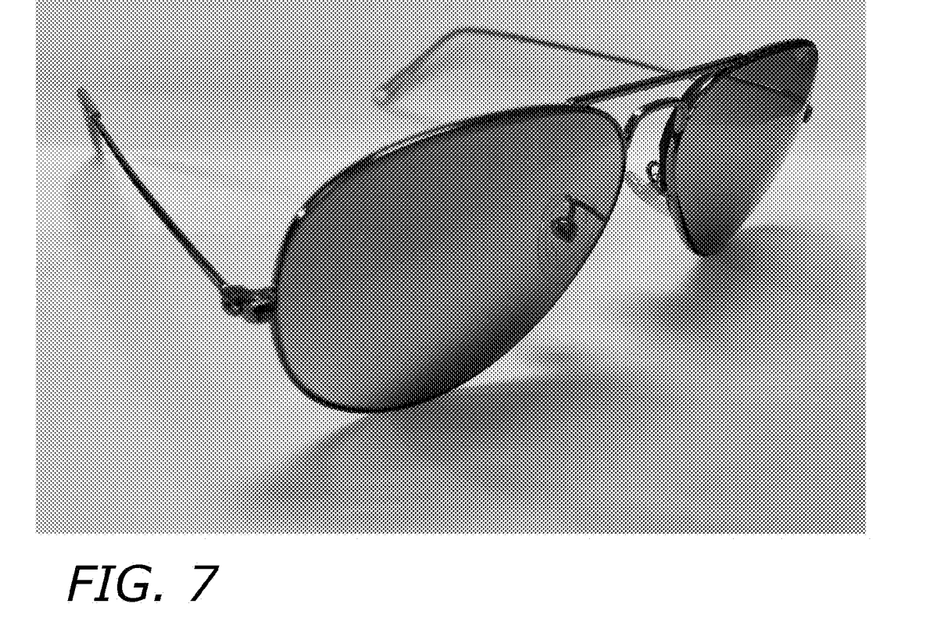
FIG. 7 is a front-side perspective of an exemplary embodiment of eyewear having multi-colored lenses illustrated in color in accordance with some embodiments.
Figure 8:
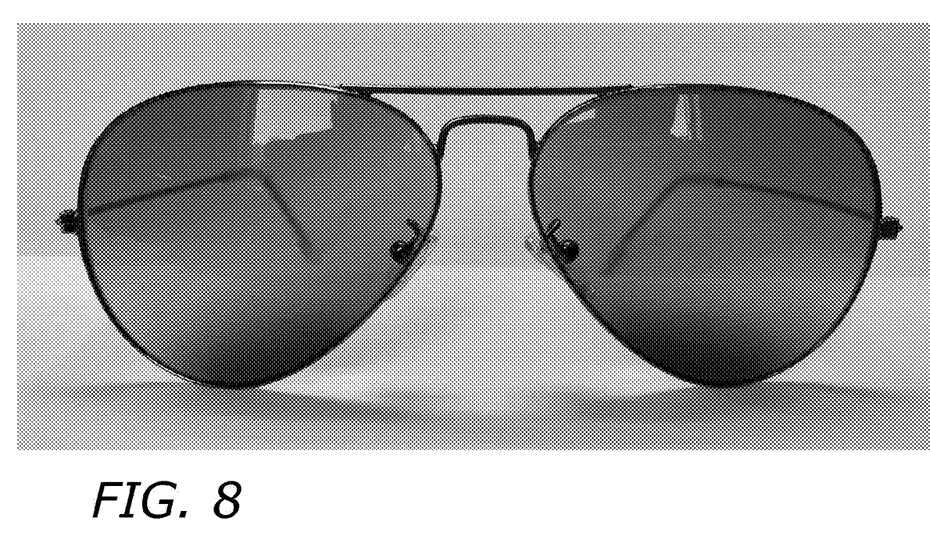
FIG. 8 is a front perspective of an exemplary embodiment of eyewear having multi-colored lenses illustrated in color in accordance with some embodiments.

Referring now to FIGS. 7-8, an exemplary embodiment of eyewear having multi-colored lenses illustrated in color is shown in accordance with some embodiments. FIGS. 7-8 illustrate one embodiment of a multi-colored pattern disposed on lenses as discussed herein. As is seen in the illustrations, the multi-colored pattern includes a range from a blue base (e.g., a lower portion of the lens that abuts the inner rim of the bottom portion of the frame) to a red upper (e.g., an upper portion of the lens that abuts the inner rim of the upper portion of the frame). The multi-colored pattern is configured and shaped as discussed above. It should be noted that alternative colors may be used in the pattern (e.g., the upper and/or lower portion may be a different color than shown). In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A lens for eyewear comprising:
a lower segment having a first coating applied thereon having a first color, wherein the first color being a portion of the color spectrum having a wavelength range of 450-495 nm or a frequency range of 670-610 THz;
an upper segment having a second coating applied thereon having a second color, wherein the second color includes a portion of the color spectrum having a wavelength range of 590-750 nm or a frequency range of 505-400 THz, wherein the second coating applied to the upper segment is a second water-soluble dye including (i) a red molecular catalytic tint and (ii) an orange molecular catalytic tint; and
a middle segment being a transition period between the lower segment and the upper segment wherein the first coating and the second coating blend together to produce a range within the color spectrum.

2. The lens of claim 1, wherein the lens is coated such that a wearer, after hitting a golf ball, views a flight of the golf ball through the upper segment.

3. The lens of claim 1, wherein the coating applied to the lower segment is a first water-soluble blue dye.

4. The lens of claim 1, wherein the lower segment covers 20-35% of the lens.

5. The lens of claim 1, wherein the upper segment covers 55-80% of the lens.

6. The lens of claim 1, wherein the middle segment covers 2-8% of the lens.

7. The lens of claim 1, wherein the lens is coated such that a wearer views an object at a ground level through the first color.

8. The lens of claim 1, wherein the lens is coated such that a wearer views a golf ball, during address of the golf ball and prior to hitting the golf ball, through the first color.

9. The lens of claim 1, wherein the lens is formed of one of polycarbonate, Trivex, high-index plastic or glass.

10. The lens of claim 1, wherein the first coating and the second coating are water-soluble dyes of differing colors.

11. A multi-colored lens comprising:
a lens component configured for placement in an eyewear frame; and
a plurality of coatings applied to the lens component, wherein the plurality of coatings includes (i) a first coating having a first color applied to a lower segment of the lens component relative to a bottom of an eyewear frame, wherein the first color being a portion of the color spectrum having a wavelength range of 450-495 nm or a frequency range of 670-610 THz, and (ii) a second coating having a second color applied to an upper segment of the lens component, wherein the second color includes a portion of the color spectrum having a wavelength range of 590-750 nm or a frequency range of 505-400 THz, wherein the second coating applied to the upper segment is a second water-soluble dye including (i) a red molecular catalytic tint and (ii) an orange molecular catalytic tint, and wherein a transition area is formed between the lower segment and the upper segment and being a transition from the first color to the second color.

12. The multi-colored lens of claim 11, wherein the multi-colored lens is coated such that a wearer, after hitting a golf ball, views a flight of the golf ball through the upper segment.

13. The multi-colored lens of claim 11, wherein the first coating applied to the lower segment is a first water-soluble blue dye.

14. The multi-colored lens of claim 11, wherein the lower segment covers 20-35% of the lens, the upper segment covers 55-80% of the lens and the transition area covers 2-8% of the lens.

* * * * *